US012423169B2

(12) United States Patent
Reddy et al.

(10) Patent No.: US 12,423,169 B2
(45) Date of Patent: *Sep. 23, 2025

(54) OPTIMAL FCAPS REPORTING VIA HOST LEVEL NORTHBOUND REPORTING AGENT

(71) Applicant: Rakuten Symphony, Inc., Tokyo (JP)

(72) Inventors: Virendra Reddy, Bangalore (IN); Prasaanth Gowravalli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/021,826

(22) PCT Filed: Jan. 24, 2023

(86) PCT No.: PCT/US2023/011381
§ 371 (c)(1),
(2) Date: Feb. 17, 2023

(87) PCT Pub. No.: WO2024/158378
PCT Pub. Date: Aug. 2, 2024

(65) Prior Publication Data
US 2025/0077328 A1  Mar. 6, 2025

(51) Int. Cl.
*G06F 11/00* (2006.01)
*G06F 11/07* (2006.01)

(52) U.S. Cl.
CPC ................. *G06F 11/0766* (2013.01)

(58) Field of Classification Search
CPC ............. G06F 11/0766; G06F 11/0781; G06F 11/0784; G06F 11/0787; G06F 11/0709; G06F 11/3006
See application file for complete search history.

(56) References Cited

U.S. PATENT DOCUMENTS 11,483,218 B2  10/2022  Al-Dulaimi et al.
11,582,327 B1   2/2023  Cifuentes de la Paz et al.
(Continued)

FOREIGN PATENT DOCUMENTS

WO  2022/069033 A1  4/2022
WO  2022/182396 A1  9/2022
(Continued)

OTHER PUBLICATIONS

Written Opinion dated May 16, 2023 in Application No. PCT/US23/11381.
(Continued)

*Primary Examiner* — Joseph D Manoskey
(74) *Attorney, Agent, or Firm* — Sughrue Mion, PLLC

(57) ABSTRACT

Provided are a method and system for handling FCAPS reporting for the FM MS and PM MS. The method may be performed by at least one processor, for reporting data to a northbound management system (NBMS), the method including: receiving, by a FCAPS reporting microservice (FCAPSR MS) from an Fault Management microservice (FM MS) of a first Radio Access Network (RAN) Network Function (NF), first data comprising fault event data, the FCAPSR MS being a host level MS; receiving, by the FCAPSR MS from an Performance Management microservice (PM MS) of the first RAN NF, second data comprising performance data; and reporting, from the FCAPSR MS to the NBMS, at least one of the first data and the second data.

20 Claims, 8 Drawing Sheets

(56) References Cited

U.S. PATENT DOCUMENTS

| | | |
|---|---|---|
| 11,751,056 B2 | 9/2023 | Russell |
| 11,818,570 B2 | 11/2023 | Rajput et al. |
| 11,880,419 B2 | 1/2024 | Libby et al. |
| 2006/0244585 A1 | 11/2006 | Bishop et al. |
| 2011/0191373 A1 | 8/2011 | Botros et al. |
| 2012/0124195 A1* | 5/2012 | Bird ................ G06F 11/0709 709/224 |
| 2014/0136906 A1* | 5/2014 | Power ............... G06F 11/0784 714/57 |
| 2014/0298350 A1 | 10/2014 | Kimata |
| 2015/0378845 A1 | 12/2015 | Shang et al. |
| 2018/0367373 A1 | 12/2018 | Chou |
| 2019/0102717 A1 | 4/2019 | Wu et al. |
| 2020/0028761 A1* | 1/2020 | Holness ............... H04L 47/125 |
| 2020/0092160 A1* | 3/2020 | Yoon ................. G06F 11/0793 |
| 2020/0322235 A1 | 10/2020 | Bothe et al. |
| 2021/0014113 A1 | 1/2021 | Guim Bernat et al. |
| 2021/0021494 A1 | 1/2021 | Yao et al. |
| 2021/0022024 A1 | 1/2021 | Yao et al. |
| 2021/0111942 A1 | 4/2021 | Tahhan et al. |
| 2022/0012608 A1 | 1/2022 | Lehmann |
| 2022/0038902 A1 | 2/2022 | Mueck |
| 2022/0109741 A1 | 4/2022 | Chen et al. |
| 2022/0167236 A1 | 5/2022 | Melodia et al. |
| 2022/0231929 A1 | 7/2022 | Li et al. |
| 2022/0358730 A1 | 11/2022 | Otsuki et al. |
| 2022/0407820 A1 | 12/2022 | Kempanna et al. |
| 2023/0043784 A1 | 2/2023 | Chandrasekaran et al. |
| 2023/0336239 A1 | 10/2023 | Schmidt et al. |
| 2023/0337019 A1* | 10/2023 | Mehta ................. H04W 24/04 |
| 2023/0388203 A1 | 11/2023 | Bothe et al. |
| 2024/0095101 A1* | 3/2024 | Patro ................. G06F 11/3006 |
| 2024/0179079 A1 | 5/2024 | Mullally et al. |
| 2024/0259253 A1* | 8/2024 | Reddy ................. H04L 41/40 |

FOREIGN PATENT DOCUMENTS

| | | |
|---|---|---|
| WO | 2023/042142 A1 | 3/2023 |
| WO | 2024/046588 A1 | 3/2024 |

OTHER PUBLICATIONS

International Search Report dated May 16, 2023 in Application No. PCT/US23/11381.

* cited by examiner

OPTIMAL FCAPS REPORTING VIA HOST LEVEL NORTHBOUND REPORTING AGENT

BACKGROUND

1. Field

Systems and methods consistent with example embodiments of the present disclosure relate to handling of northbound fault event reporting and performance data reporting for fault management and performance management microservices.

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Recently, the evolution of telco technologies enables many telco services to be realized virtually, in the form of software. For instance, RANs such as Open RAN (O-RAN) architectures, disaggregate one network component into multiple functional elements. By way of example, a baseband unit (BBU) or base station (i.e., eNB or gNB) is disaggregated into a number of functional elements including a distributed unit (DU) and a centralized unit (CU), wherein the CU can be further disaggregated into Centralized Unit-Control Plane (CU-CP) and Centralized Unit-User Plane (CU-UP). The disaggregation of network elements enables the telco services and the associated functions to be defined and provided in software-based form or virtual network services, such as Virtualized Network Functions (VNFs), Cloud-native Network Functions (CNFs) or Software Defined Networking (SDN), among others.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The SMO framework manages and orchestrates RAN elements. Specifically, the SMO includes a Federated O-Cloud Orchestration and Management (FOCOM), a Network Function Orchestrator (NFO) that manages Virtual Machines (VM) based VNF and container (i.e., instance) based VNF, and the OAM as a part of the SMO that manages and orchestrates what is referred to as the O-Ran Cloud (O-Cloud).

Further, the SMO may include an operational support system (OSS) and an element management system (EMS), each of which is configurable to perform one or more of: fault management operation, configuration management operation, account management operation, performance management operation, and security management operation (FCAPS operations), on one or more services hosted or deployed in the servers. In some embodiments, the service management system may include a plurality of EMSs, each of the plurality of EMSs may be configured to manage a single service or a group of services associated with a particular vendor/service provider, and the OSS interfaces between the monitoring system, orchestrator, and the plurality of EMSs. Accordingly, the SMO may provide a single control point for managing a plurality of services (associated with multiple vendors/network service providers) via only one monitoring system and one orchestrator system (i.e., one monitoring system and one orchestrator system can be utilized to manage services associated with multiple vendors/service providers).

In the related art 5G architecture (O-RAN based), functionalities or subsystems in a Network Function (NF) may be implemented as microservices. For example, RU manager is a microservice which handles the DU<->RU related transactions. Baseband microservice implements the layer-1 and layer-2 of the 5G stack. FCAPS microservices is a set of microservices which handle aspects of the system like Fault Management (FM), Configuration Management (CM) and Performance Management (PM) of the gNodeB Network Function (gNB NF).

Fault Management microservice (FM MS) is responsible for collecting various events related to the functionality aspects (e.g., faults, error conditions, etc.) of the 5G O-RAN subsystems (such as those described above) within an NF. The FM MS may collect the corresponding fault events, e.g., cell down, F1C link down, timing locked, etc., from various microservices present in the gNB NF.

Performance Management microservice (PM MS) is responsible for collecting various statistics and counters related to performance aspects of the 5G O-RAN subsystems (such as those described above) within an NF. It then reports the performance statistics, e.g., throughput, active users, cell uptime, etc., after enriching the data summary to the north bound management system at predefined regular intervals.

Further, FM MS handles the Fault Management events that are related to functionality aspects, and PM MS handles the Performance Management statistics and counters related to performance aspects. FM MS and PM MS are quite similar microservices with respect to their interaction with the subsystems (collection and persistence aspect) and the northbound (reporting aspect). The FM MS or PM MS, based on predefined conditions, send notification reports to a Northbound Management System (NBMS). The NBMS, based on the notification reports, may create an alarm and consequently, initiates a triggering procedure for post processing or corrective measures that are associated with the alarm.

FIG. 2 is a block diagram of a communication flow of a Network Function (NF) 260 and a NBMS 210 in the related art. Referring to FIG. 2, the related art approach is to have a set of FM MS 220 and PM MS 230 to receive, store (in persistence layer 240), process, and transmit to the NBMS 210 (e.g., EMS and/or OSS) events and statistics received from microservices **250-1, 250-2, . . . , 250-*n* (e.g., microservices implementing various subsystems as described above of the NF) based on predetermined criteria. The FM MS includes a fault reporting agent 221 and PM MS includes a stats reporting agent 231** that are responsible for reporting the processed data to the NBMS.

FIG. 3 is a block diagram of components of a Fault Management (FM) microservice 310 and a Performance Management (PM) microservice 320 implemented in an NF. Referring to FIG. 3, the FM MS 310 may include: event collection agent 311 for receiving event data (e.g., fault-related event data) from subsystems (i.e., microservices) in the NF; persistence agent 312 for storing the received event data (in either or both of raw data form as received or enriched/encoded form as processed by the FM MS 310); event data enrichment & encoding agent 313 for enriching and encoding the received event data (raw data); and event reporting agent 314 for reporting the enriched and encoded event data to the NBMS. The PM MS 320 may include: stats collection agent 321 for receiving performance statistics data from subsystems (i.e., microservices) in the NF; persistence agent 322 for storing the received performance statistics data (in either or both of raw data form as received or aggregated/encoded form as processed by the PM MS 320); stats data aggregation & encoding agent 323 for aggregating and encoding the received statistics data (raw data); and stats reporting agent 324 for reporting the aggregated and encoded statistics data to the NBMS.

In the related art, as explained above, event reporting agent 314 may be responsible for reporting the enriched and encoded event data to the NBMS, and stats reporting agent 324 may be responsible for reporting the aggregated and encoded statistics data to the NBMS. However, if there are multiple NFs, then each NF will require its own fault reporting logic and statistics reporting logic, and thereby will require multiple IP addresses, which will lead to using duplicate event reporting agents 314 and stats reporting agents 324 per NF. This can be burdensome to the network resources, particularly by increasing the number of IP addresses that need to be managed, as well as the management/maintenance cost of the transport mechanism for the fault event reporting and statistics reporting. Therefore, there is a need to introduce optimal FCAPS reporting so that there is no redundancy and to reduce the cost of reporting fault events and performance statistics from FM microservice 310 and PM microservice 320 respectively to the NBMS.

SUMMARY

Example embodiments of the present disclosure provide a method and system for handling FCAPS reporting for the FM MS and PM MS. Particularly, the event reporting agent and stats reporting agent may be separated into a FCAPS reporting microservice (SR MS) for the host, which can handle both the fault event reporting and statistics reporting for each NF to the NBMS.

Accordingly, example embodiments of the present disclosure can substantially reduce the network resources required for handling FCAPS reporting, and reduce the number of IP addresses used. This may also reduce the amount of configurations necessary on the NBMS side. Furthermore, example embodiments of the present disclosure can also reduce the amount of reliability testing required since the FCAPS reporting MS can be tested for the host independently of the NF (i.e., the NF does not need to be deployed for the reliability testing). Accordingly, the embodiments of the present disclosure may provide a more efficient and optimal approach of handling FCAPS reporting.

According to embodiments, a method performed by at least one processor, for reporting data to a northbound management system (NBMS) may be provided. The method may include: receiving, by a FCAPS reporting microservice (FCAPSR MS) from an Fault Management microservice (FM MS) of a first Radio Access Network (RAN) Network Function (NF), first data comprising fault event data; receiving, by the FCAPSR MS from an Performance Management microservice (PM MS) of the first RAN NF, second data comprising performance data; and reporting, from the FCAPSR MS to the NBMS, at least one of the first data and the second data.

The method may further include receiving, by the FCAPSR MS from another FM MS of a second RAN NF, third data comprising fault event data; receiving, by the FCAPSR MS from another PM MS of a second RAN NF, fourth data comprising performance data; and reporting, from the FCAPSR MS to the NBMS, at least one of the third data and the fourth data.

The fault event data may include information on at least one fault or error event, and the performance data may include at least one performance statistic or counter.

The first data may be collected by the FM MS in the first RAN NF, and the second data may be collected by the PM MS in the first RAN NF.

The method may further include storing, by the FCAPSR MS, at least one of the first data and the second data in a persistent storage for at least one of resiliency of FCAPSR MS and restart handling of FCAPSR MS.

The first data may be processed and/or encoded by the FM MS after being collected, and the second data may be processed and/or encoded by the PM MS after being collected.

The first data may be processed by enriching or aggregating by the FM MS after being collected, and the second data may be processed by enriching or aggregating by the PM MS after being collected.

According to embodiments, an apparatus for reporting data to a northbound management system (NBMS) may be provided. The apparatus may include at least one processor configured to execute computer-executable instructions to: receive, by a FCAPS reporting microservice (FCAPSR MS) from an Fault Management microservice (FM MS) of a first Radio Access Network (RAN) Network Function (NF), first data comprising fault event data, the FCAPSR MS being a host level MS; receive, by the FCAPSR MS from an Performance Management microservice (PM MS) of the first RAN NF, second data comprising performance data; and report, from the FCAPSR MS to the NBMS, at least one of the first data and the second data.

The at least one processor may be further configured to execute the computer-executable instructions to: receive, by the FCAPSR MS from another FM MS of a second RAN NF, third data comprising fault event data; receive, by the FCAPSR MS from another PM MS of a second RAN NF, fourth data comprising performance data; and report, from the FCAPSR MS to the NBMS, at least one of the third data and the fourth data.

The at least one processor may be further configured to execute the computer-executable instructions to: store, by the FCAPSR MS, at least one of the first data and the second data in a persistent storage for at least one of resiliency of FCAPSR MS and restart handling of FCAPSR MS.

According to embodiments, a non-transitory computer-readable recording medium having recorded thereon instructions executable by at least one processor to cause the at least one processor to perform a method may be provided. The method may include: receiving, by a FCAPS reporting microservice (FCAPSR MS) from an Fault Management microservice (FM MS) of a first Radio Access Network (RAN) Network Function (NF), first data comprising fault event data, the FCAPSR MS being a host level MS; receiving, by the FCAPSR MS from an Performance Management microservice (PM MS) of the first RAN NF, second data comprising performance data; and reporting, from the FCAPSR MS to the NBMS, at least one of the first data and the second data.

The method may further include: receiving, by the FCAPSR MS from another FM MS of a second RAN NF, third data comprising fault event data; receiving, by the FCAPSR MS from another PM MS of a second RAN NF, fourth data comprising performance data; and reporting, from the FCAPSR MS to the NBMS, at least one of the third data and the fourth data.

The method may further include: storing, by the FCAPSR MS, at least one of the first data and the second data in a persistent storage for at least one of resiliency of FCAPSR MS and restart handling of FCAPSR MS.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
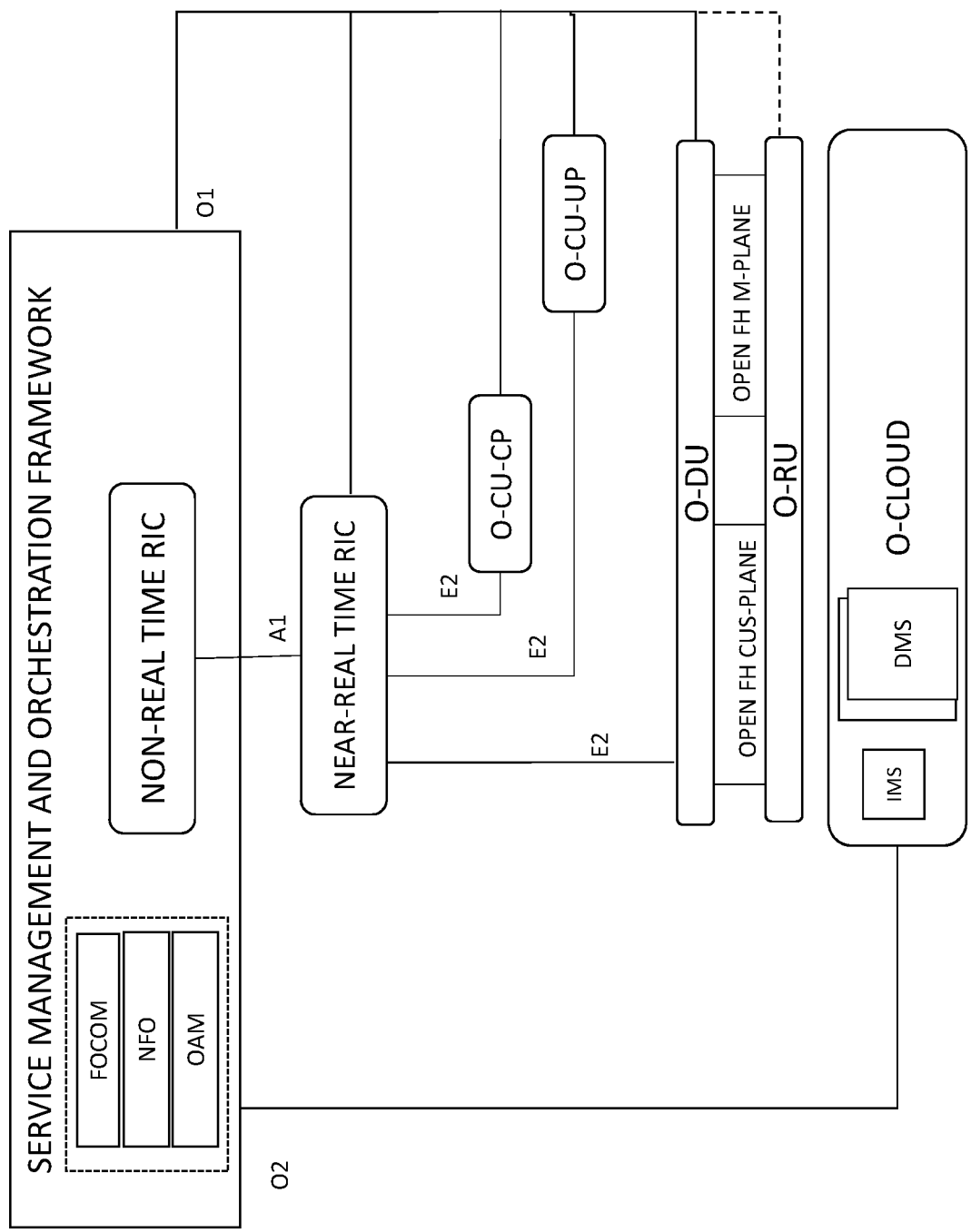
FIG. 1 illustrates an O-RAN architecture according to the related art.
Figure 2:
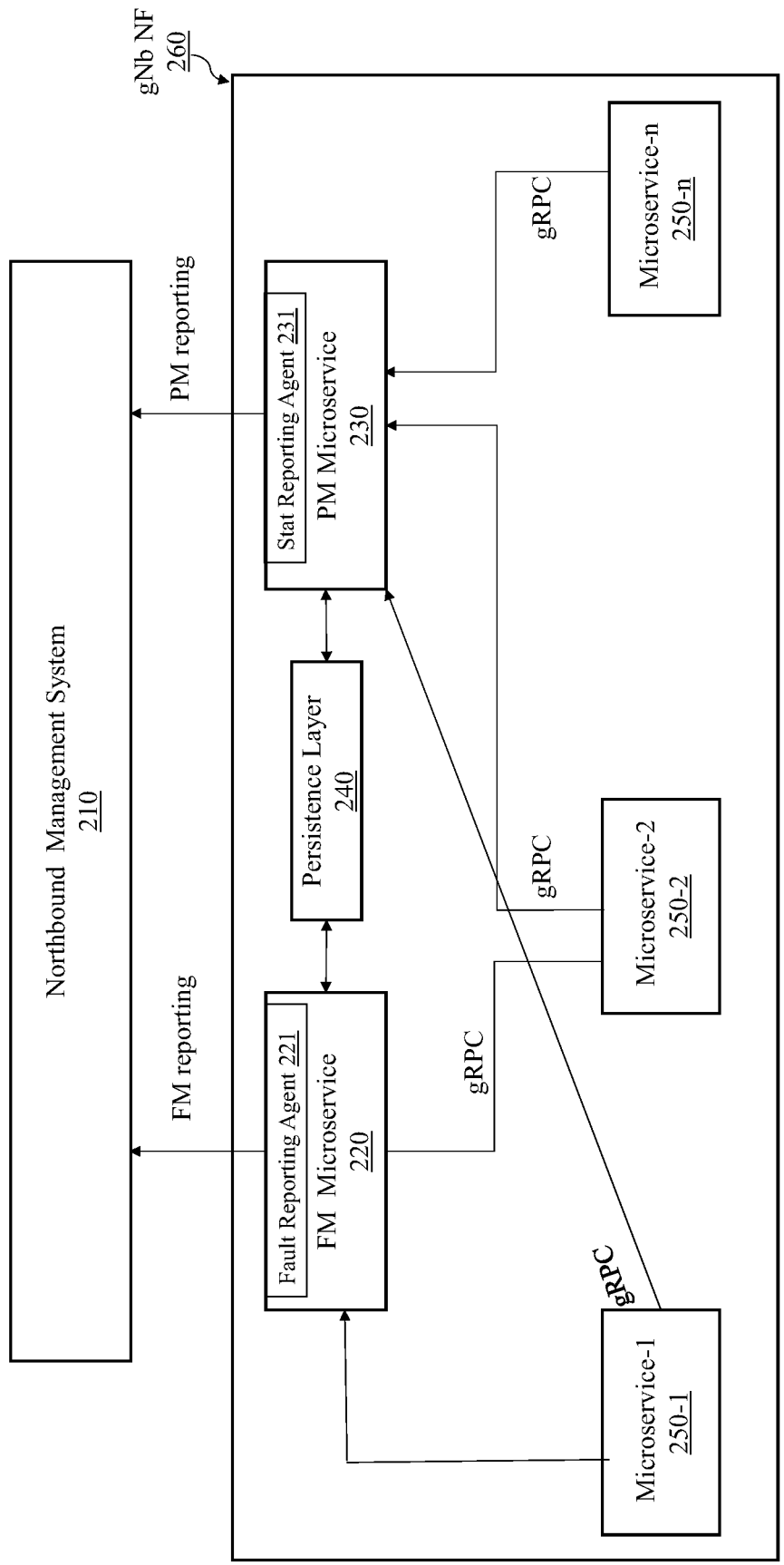
FIG. 2 is a block diagram of a communication flow of a Network Function (NF) and a NorthBound Management System (NBMS) in the related art.
Figure 3:
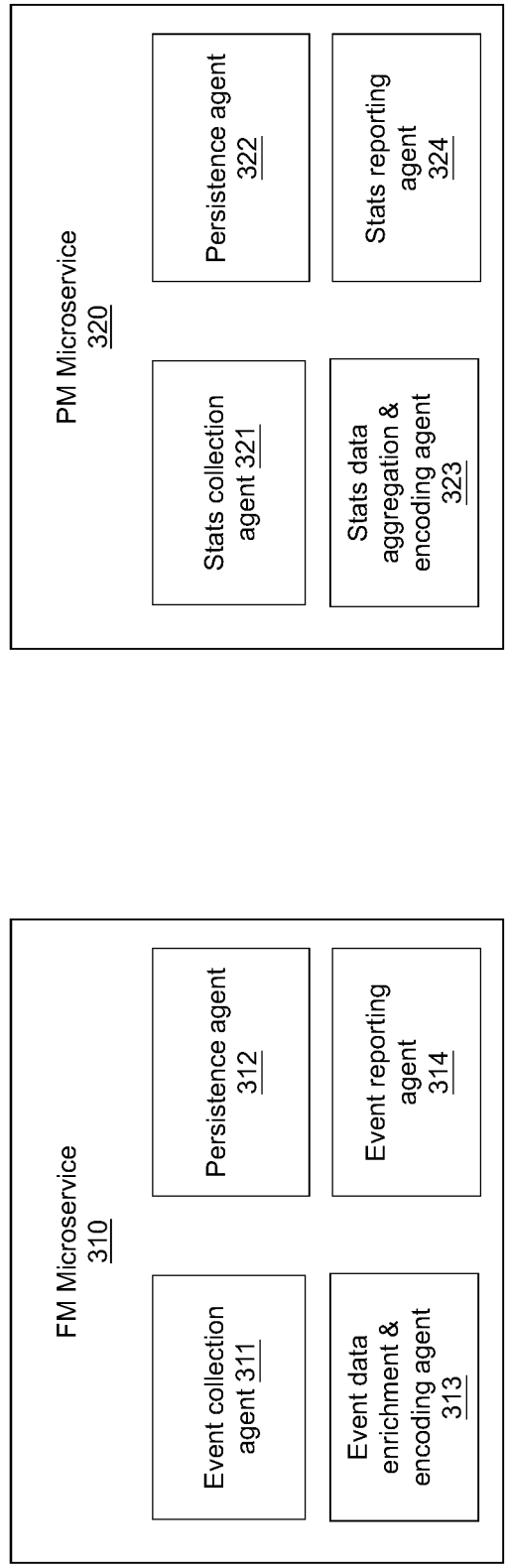
FIG. 3 is a block diagram of components of a Fault Management (FM) microservice and a Performance Management (PM) microservice implemented in an NF.

The following detailed description of example embodiments refers to the accompanying drawings.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present disclosure provide a method and system for handling FCAPS reporting for the FM MS and PM MS. Particularly, the event reporting agent and stats reporting agent may be separated into a FCAPS reporting microservice (SR MS) for the host, which can handle both the fault event reporting and statistics reporting for each NF to the NBMS. Accordingly, example embodiments of the present disclosure can substantially reduce the network resources required for handling FCAPS reporting, and reduce the number of IP addresses used. This may also reduce the amount of configurations necessary on the NBMS side. Furthermore, example embodiments of the present disclosure can also reduce the amount of reliability testing required since the FCAPS reporting MS can be tested for the host independently of the NF (i.e., the NF does not need to be deployed for the reliability testing).

Accordingly, the embodiments of the present disclosure may provide a more efficient and optimal approach of handling FCAPS reporting.

Figure 4:
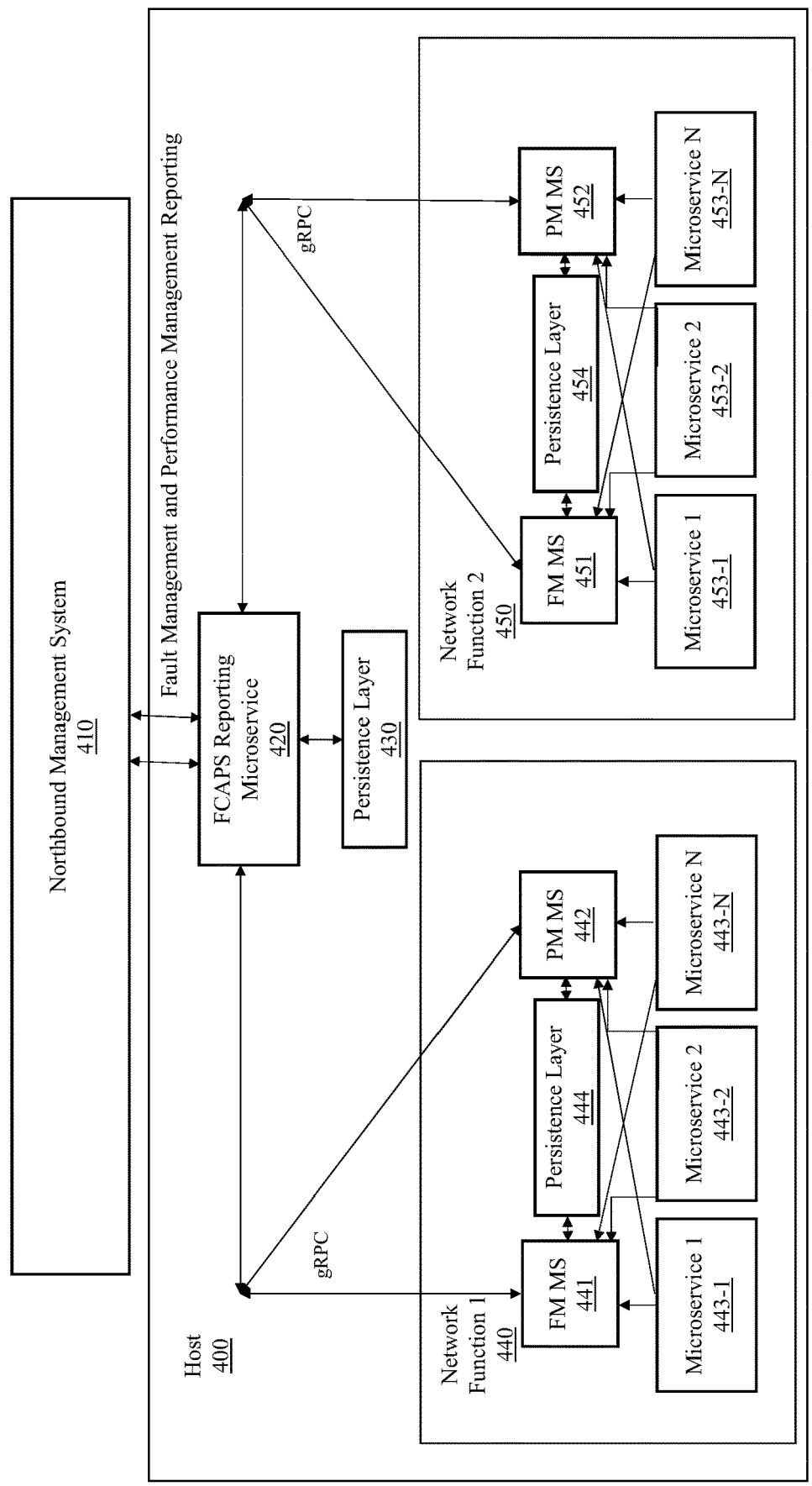
FIG. 4 is a block diagram of a communication flow of two Network Functions (NF) in a host, a FCAPS reporting microservice (FCAPSR MS) and a NorthBound Management System (NBMS) for optimal FCAPS reporting, according to an embodiment.

FIG. 4 is a block diagram of a communication flow of two Network Functions (NF) 440, 450 (e.g., CU, DU, etc.), a FCAPS reporting microservice (FCAPSR MS) 420, and a Northbound Management System (NBMS) 410 for optimal performance management reporting, according to an example embodiment. NF 440, 450 and FCAPSR MS 450 may be implemented in the same Host 400. In some embodiments, Host 400 may be a server or a virtual machine in cloud infrastructure, but may be any appropriate platform, for instance, as discussed in detail in the related descriptions for FIGS. 7 and 8 below. NF 440 may include fault management microservice (FM MS) 441 and performance management microservice (PM MS) 442, and NF 450 may likewise include FM MS 451 and PM MS 452. FM MS 441 may collect fault event data from connected microservices (microservices 443-1, 443-2, 443-n), and PM MS 441 may collect performance data from said connected microservices. Likewise, FM MS 451 and PM MS 452 may collect data from connected microservices (microservices 453-1, 453-2, 453-n). FM MS 441, PM MS 442 may store the raw collected data in persistent layer (storage) 444. FM MS 451, PM 452 may similarly store the raw collected data in persistent layer (storage) 454. This, for example, allows the MS to subsequently retrieve the raw data for processing even if the MS needs to restart or reboot. FM MS 441, 451 and PM MS 442, 452 may perform processing/encoding on the raw collected data prior to being reported. In some embodiments, processing may include aggregating or enriching of the collected data by the FM MS or PM MS. The fault event data may be sent directly from FM MS 441, 451 to FCAPSR MS 420 (e.g., over gRPC), and performance data may be sent directly from PM MS 442, 452 to FCAPSR MS 420 (e.g., over gRPC), so that the data can be reported to NBMS 410. FCAPSR MS 420 may also be connected to a persistence layer (storage) 430 for storing fault event data, performance data and/or other configuration data necessary for reporting to NBMS from each NF. For example, based on receiving the reported fault event data, the FCAPSR MS 420 may store the received data in persistence layer 430. In this case, by way of example, the data may be retrieved by the FCAPSR MS 420 if needed (e.g., in case of a reset of the FCAPSR MS 420, in case the northbound reporting fails, etc.). The persistence layer (storage) may be used, for example, for the purpose of resiliency of FCAPSR MS and restart handling of FCAPSR MS.

In some embodiments, the NBMS 410 may implement a Kafka cluster to collect FM fault event data and PM performance data. Kafka is an open-source system that provides a unified, high-throughput, low-latency platform for handling real-time data feeds. Kafka can connect to external systems (for data import/export) via Kafka Connect, and provides the Kafka Streams libraries for stream processing applications. Kafka uses a binary TCP-based protocol that is optimized for efficiency and relies on a "message set" abstraction that naturally groups messages together to reduce the overhead of the network roundtrip. While Kafka may be used in some embodiments, other real time data streams may be used, and these streams may also be open-source. The use of real time data streams, and microservices create a new restructuring open-source platform. The data from FCAPSR MS 420 may have an Internet Protocol (IP) address (e.g., IPv4, IPv6, etc.) through which it may communicate to the NBMS 410.

According to the example embodiments as described above, NBMS 410 will accordingly only need to be configured (e.g., Kafka endpoints, etc.) for the FCAPSR MS 420 (i.e., at the infrastructure level), and does not need to be configured specifically for each of FM MS 441, PM MS 442 of NF 440 and FM MS 451 and PM MS 452 of NF 450. Put in other terms, the number of configurations for the NBMS 410 does not need to be on a per MS/NF basis. Furthermore, since only FCAPSR MS 420 will need to communicate with NBMS 410, the number of IP addresses need to communicate will be substantially decreased. As a result, optimal FCAPS reporting can be achieved since the configurations required by the NBMS are decreased, and the network resources utilized may be reduced.

Further, according to the example embodiments as described above, since FCAPSR MS 420 is independent of NF 440 and NF 450, reliance testing may be performed independently of the NFs (e.g., the NFs do not need to be deployed), and on a per host basis. As a result, the amount of reliability testing upon host deployment may be reduced.

Figure 5:
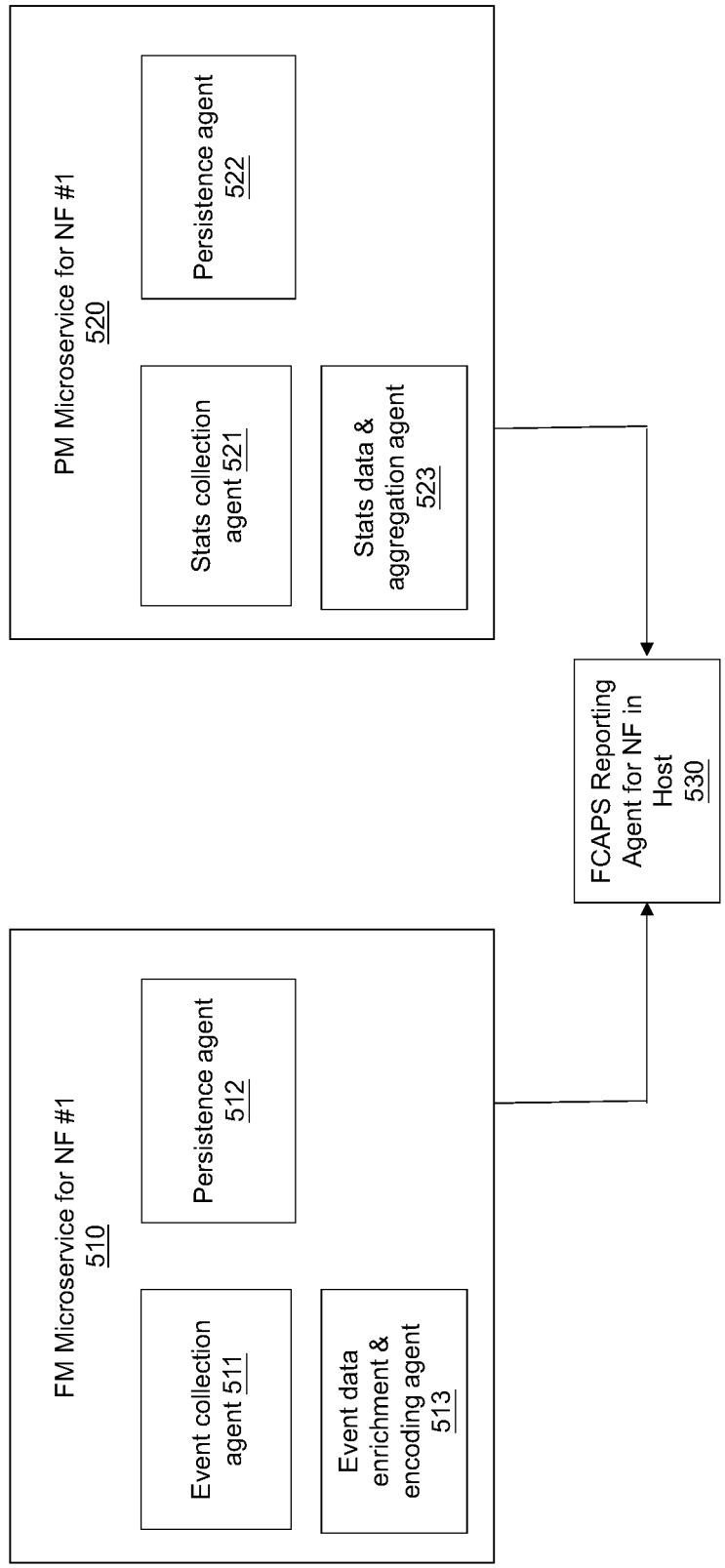
FIG. 5 is a block diagram of components of a FM and a PM microservice and a connected FCAPS reporting agent, according to an example embodiment.

FIG. 5 is a block diagram of components of a FM microservice 510 and a PM microservice 520, according to an example embodiment. Referring to FIG. 5, FM MS 510 with may include: event collection agent 511 for receiving event data (e.g., fault-related event data) from subsystems (i.e., microservices) in the NF; persistence agent 512 for storing the received event data (in either or both of raw data form as received or enriched/encoded form as processed by the FM MS 510); and event data enrichment & encoding agent 513 for enriching and encoding the received event data (raw data).

The PM MS 520 may include: stats collection agent 521 for receiving performance statistics data from subsystems (i.e., microservices) in the NF; persistence agent 522 for storing the received performance statistics data (in either or both of raw data form as received or aggregated/encoded form as processed by the PM MS 520); and stats data aggregation & encoding agent 523 for aggregating and encoding the received statistics data (raw data.

FM MS 510 and PM MS 520 may communicate with FCAPS reporting agent 530, which may report the fault event data and performance statistics data to the NBMS 410 (this may be the enriched/encoded data).

Figure 6:
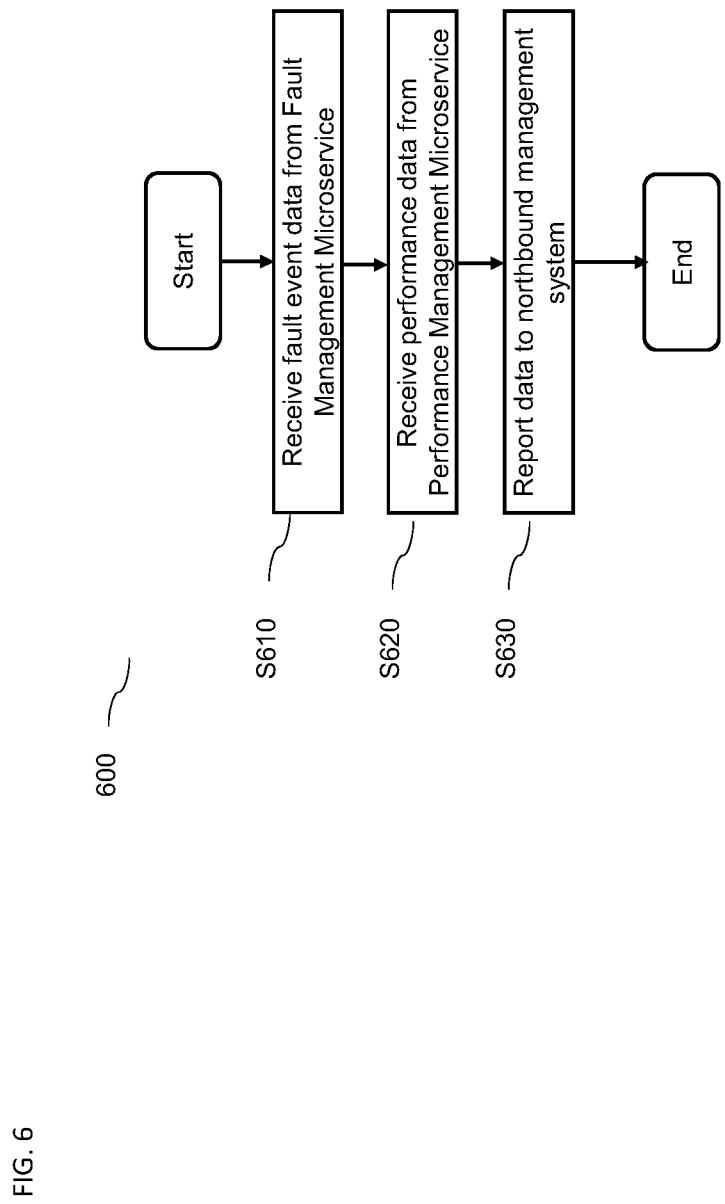
FIG. 6 is a flowchart of a method for optimal FCAPS reporting, according to an embodiment.

FIG. 6 is a flowchart of a method 600 for optimal performance management reporting, according to an embodiment. Operations S610, S620, and S630 may be performed by the FCAPSR MS (i.e., FCAPSR MS 420 in FIG. 4 above).

At operation S610, FCAPSR MS receives fault event data from FM MS (i.e., FM MS 441 or FM MS 451 in FIG. 4 above). As previously mentioned, this performance data may have been generated/processed from raw collected data (from connected microservices) by the FM MS, prior to being sent by the FM MS to the FCAPSR MS.

At operation S620, FCAPSR MS receives performance/statistics data from PM MS (i.e., PM MS 442 or PM MS 452 in FIG. 4 above). As previously mentioned, this performance data may have been generated/processed from raw collected data (from connected microservices) by the PM MS, prior to being sent by the PM MS to the SR MS.

At operation S630, FCAPSR MS reports the data to the NBMS (i.e., NBMS 410 in FIG. 4 above). This may include sending one of the fault event data received in operation S610, sending one of the performance data received in operation S620, or both. The configurations/protocols for sending the data may be configured by the NBMS, according to some embodiments.

Figure 7:
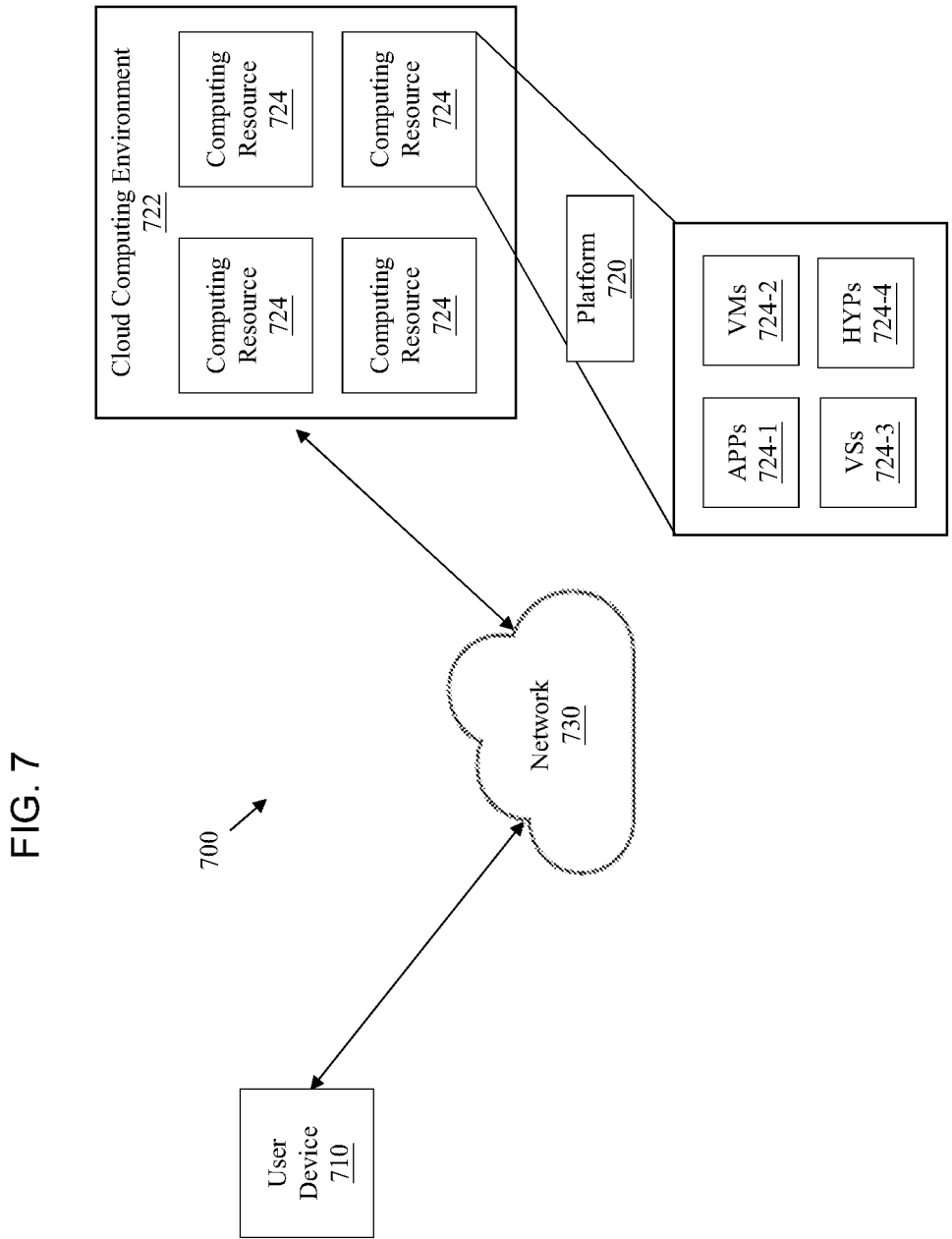
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 4 through 6 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
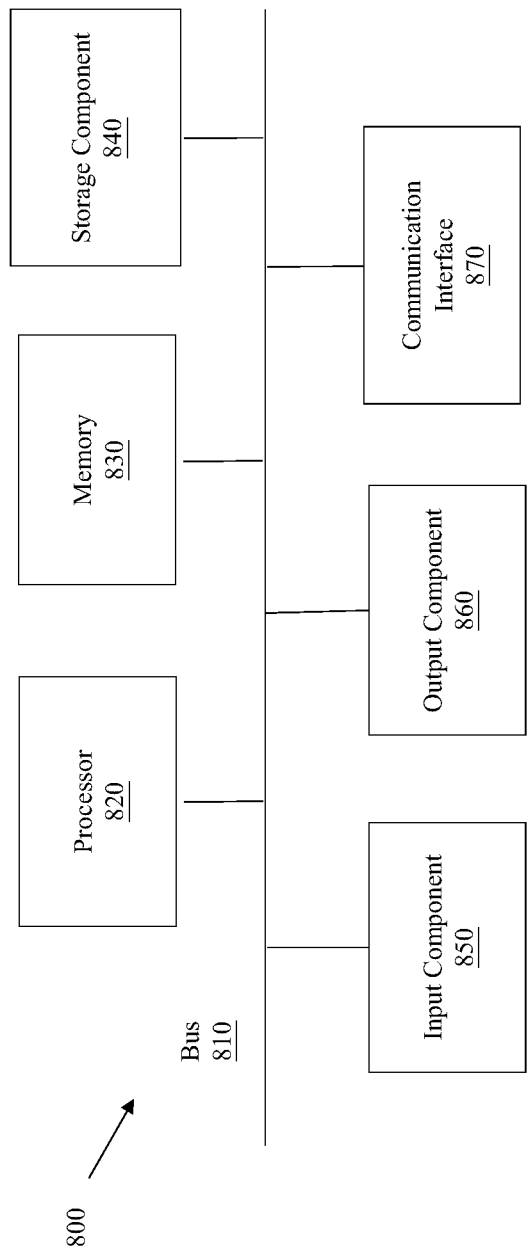
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 4 through 6 may be implemented by or using any one of the elements illustrated in FIGS. 8 and 9. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various Aspects of Embodiments

Various further respective aspects and features of embodiments of the present disclosure may be defined by the following items:

Item [1]: A method, performed by at least one processor, for reporting data to a northbound management system (NBMS), the method comprising: receiving, by a FCAPS reporting microservice (FCAPSR MS) from an Fault Management microservice (FM MS) of a first Radio Access Network (RAN) Network Function (NF), first data comprising fault event data; receiving, by the FCAPSR MS from an Performance Management microservice (PM MS) of the first RAN NF, second data comprising performance data; and reporting, from the FCAPSR MS to the NBMS, at least one of the first data and the second data.

Item [2]: The method according to item 1, further comprising: receiving, by the FCAPSR MS from another FM MS of a second RAN NF, third data comprising fault event data; receiving, by the FCAPSR MS from another PM MS of a second RAN NF, fourth data comprising performance data; and reporting, from the FCAPSR MS to the NBMS, at least one of the third data and the fourth data.

Item [3]: The method according to any one of items [1]-[2], wherein the fault event data comprises information on at least one fault or error event, and wherein the performance data comprises at least one performance statistic or counter.

Item [4]: The method according to any one of items [1]-[3], wherein the first data is collected by the FM MS in the first RAN NF, and wherein the second data is collected by the PM MS in the first RAN NF.

Item [5]: The method according to any one of items [1]-[4], further comprising: storing, by the FCAPSR MS, at least one of the first data and the second data in a persistent storage for at least one of resiliency of FCAPSR MS and restart handling of FCAPSR MS.

Item [6]: The method according to item [4], wherein the first data is processed and/or encoded by the FM MS after being collected, and wherein the second data is processed and/or encoded by the PM MS after being collected.

Item [7]: The method according to item [6], wherein the first data is processed by enriching or aggregating by the FM MS after being collected, and wherein the second data is processed by enriching or aggregating by the PM MS after being collected.

Item [8]: An apparatus for reporting data to a northbound management system (NBMS), the apparatus comprising at least one processor configured to execute computer-executable instructions to: receive, by a FCAPS reporting microservice (FCAPSR MS) from an Fault Management microservice (FM MS) of a first Radio Access Network (RAN) Network Function (NF), first data comprising fault event data, the FCAPSR MS being a host level MS; receive, by the FCAPSR MS from an Performance Management microservice (PM MS) of the first RAN NF, second data comprising performance data; and report, from the FCAPSR MS to the NBMS, at least one of the first data and the second data.

Item [9]: The apparatus according to item [8], wherein the at least one processor is further configured to execute the computer-executable instructions to: receive, by the FCAPSR MS from another FM MS of a second RAN NF, third data comprising fault event data; receive, by the FCAPSR MS from another PM MS of a second RAN NF, fourth data comprising performance data; and report, from the FCAPSR MS to the NBMS, at least one of the third data and the fourth data.

Item [10]: The apparatus according to any one of items [8]-[9], wherein the fault event data comprises information on at least one fault or error event, and wherein the performance data comprises at least one performance statistic or counter.

Item [11]: The apparatus according to any one of items [8]-[10], wherein the first data is collected by the FM MS in the first RAN NF, and wherein the second data is collected by the PM MS in the first RAN NF.

Item [12]: The apparatus according to any one of items [8]-[11], wherein the at least one processor is further configured to execute the computer-executable instructions to: store, by the FCAPSR MS, at least one of the first data and the second data in a persistent storage for at least one of resiliency of FCAPSR MS and restart handling of FCAPSR MS.

Item [13]: The apparatus according to item [11], wherein the first data is processed and/or encoded by the FM MS after being collected, and wherein the second data is processed and/or encoded by the PM MS after being collected.

Item [14]: The apparatus according to item [13], wherein the first data is processed by enriching or aggregating by the FM MS after being collected, and wherein the second data is processed by enriching or aggregating by the PM MS after being collected.

Item [15]: A non-transitory computer-readable recording medium having recorded thereon instructions executable by at least one processor to cause the at least one processor to perform a method comprising: receiving, by a FCAPS reporting microservice (FCAPSR MS) from an Fault Management microservice (FM MS) of a first Radio Access Network (RAN) Network Function (NF), first data comprising fault event data, the FCAPSR MS being a host level MS; receiving, by the FCAPSR MS from an Performance Management microservice (PM MS) of the first RAN NF, second data comprising performance data; and reporting, from the FCAPSR MS to the NBMS, at least one of the first data and the second data.

Item [16]: The non-transitory computer readable recording medium according to item [15], the method further comprising: receiving, by the FCAPSR MS from another FM MS of a second RAN NF, third data comprising fault event data; receiving, by the FCAPSR MS from another PM MS of a second RAN NF, fourth data comprising performance data; and reporting, from the FCAPSR MS to the NBMS, at least one of the third data and the fourth data.

Item [17]: The non-transitory computer readable recording medium according to any one of items [15]-[16], wherein the fault event data comprises information on at least one fault or error event, and wherein the performance data comprises at least one performance statistic or counter.

Item [18]: The non-transitory computer readable recording medium according to any one of items [15]-[17], wherein the first data is collected by the FM MS in the first RAN NF, and wherein the second data is collected by the PM MS in the first RAN NF.

Item [19]: The non-transitory computer readable recording medium according to any one of items [15]-[18], further comprising: storing, by the FCAPSR MS, at least one of the first data and the second data in a persistent storage for at least one of resiliency of FCAPSR MS and restart handling of FCAPSR MS.

Item [20]: The non-transitory computer readable recording medium according to item [18], wherein the first data is processed and/or encoded by the FM MS after being collected, and wherein the second data is processed and/or encoded by the PM MS after being collected.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method, performed by at least one processor, for reporting data to a northbound management system (NBMS), the method comprising:
receiving, by a FCAPS reporting microservice (FCAPSR MS) from Fault Management microservice (FM MS) of a first Radio Access Network (RAN) Network Function (NF), first data comprising fault event data, the FCAPSR MS being a host level MS;
receiving, by the FCAPSR MS from an Performance Management microservice (PM MS) of the first RAN NF, second data comprising performance data; and
reporting, from the FCAPSR MS to the NBMS, at least one of the first data and the second data,
wherein the FCAPSR MS and the first RAN NF are both located within a same host, and the FCAPSR MS is external and distinct from the first RAN NF comprising the FM MS and the PM MS.

2. The method as claimed in claim 1, further comprising:
receiving, by the FCAPSR MS from another FM MS of a second RAN NF, third data comprising fault event data;
receiving, by the FCAPSR MS from another PM MS of a second RAN NF, fourth data comprising performance data; and
reporting, from the FCAPSR MS to the NBMS, at least one of the third data and the fourth data,
wherein the FCAPSR MS, the first RAN NF, and the second RAN NF are all located within the same host, and the FCAPSR MS is external and distinct from the first RAN NF comprising the FM MS and the PM MS and the second RAN NF comprising the other FM MS and the other PM MS.

3. The method as claimed in claim 1, wherein the fault event data comprises information on at least one fault or error event, and wherein the performance data comprises at least one performance statistic or counter.

4. The method as claimed in claim 1, wherein the first data is collected by the FM MS in the first RAN NF, and wherein the second data is collected by the PM MS in the first RAN NF.

5. The method as claimed in claim 4, wherein the first data is processed and/or encoded by the FM MS after being collected, and wherein the second data is processed and/or encoded by the PM MS after being collected.

6. The method as claimed in claim 5, wherein the first data is processed by enriching or aggregating by the FM MS after being collected, and wherein the second data is processed by enriching or aggregating by the PM MS after being collected.

7. The method as claimed in claim 1, further comprising:
storing, by the FCAPSR MS, at least one of the first data and the second data in a persistent storage for at least one of resiliency of FCAPSR MS and restart handling of FCAPSR MS.

8. An apparatus for reporting data to a northbound management system (NBMS), the apparatus comprising at least one processor configured to execute computer-executable instructions to:
receive, by a FCAPS reporting microservice (FCAPSR MS) from a Fault Management microservice (FM MS) of a first Radio Access Network (RAN) Network Function (NF), first data comprising fault event data, the FCAPSR MS being a host level MS;
receive, by the FCAPSR MS from an Performance Management microservice (PM MS) of the first RAN NF, second data comprising performance data; and
report, from the FCAPSR MS to the NBMS, at least one of the first data and the second data,
wherein the FCAPSR MS and the first RAN NF are both located within a same host, and the FCAPSR MS is external and distinct from the first RAN NF comprising the FM MS and the PM MS.

9. The apparatus as claimed in claim 8, wherein the at least one processor is further configured to execute the computer-executable instructions to:
receive, by the FCAPSR MS from another FM MS of a second RAN NF, third data comprising fault event data;
receive, by the FCAPSR MS from another PM MS of a second RAN NF, fourth data comprising performance data; and
report, from the FCAPSR MS to the NBMS, at least one of the third data and the fourth data,
wherein the FCAPSR MS, the first RAN NF, and the second RAN NF are all located within the same host, and the FCAPSR MS is external and distinct from the first RAN NF comprising the FM MS and the PM MS and the second RAN NF comprising the other FM MS and the other PM MS.

10. The apparatus as claimed in claim 8, wherein the fault event data comprises information on at least one fault or error event, and wherein the performance data comprises at least one performance statistic or counter.

11. The apparatus as claimed in claim 8, wherein the first data is collected by the FM MS in the first RAN NF, and wherein the second data is collected by the PM MS in the first RAN NF.

12. The apparatus as claimed in claim 11, wherein the first data is processed and/or encoded by the FM MS after being collected, and wherein the second data is processed and/or encoded by the PM MS after being collected.

13. The apparatus as claimed in claim 12, wherein the first data is processed by enriching or aggregating by the FM MS after being collected, and wherein the second data is processed by enriching or aggregating by the PM MS after being collected.

14. The apparatus as claimed in claim 8, wherein the at least one processor is further configured to execute the computer-executable instructions to:
store, by the FCAPSR MS, at least one of the first data and the second data in a persistent storage for at least one of resiliency of FCAPSR MS and restart handling of FCAPSR MS.

15. A non-transitory computer-readable recording medium having recorded thereon instructions executable by at least one processor to cause the at least one processor to perform a method comprising:
receiving, by a FCAPS reporting microservice (FCAPSR MS) from a Fault Management microservice (FM MS) of a first Radio Access Network (RAN) Network Function (NF), first data comprising fault event data, the FCAPSR MS being a host level MS;
receiving, by the FCAPSR MS from an Performance Management microservice (PM MS) of the first RAN NF, second data comprising performance data; and
reporting, from the FCAPSR MS to the NBMS, at least one of the first data and the second data,
wherein the FCAPSR MS and the first RAN NF are both located within a same host, and the FCAPSR MS is external and distinct from the first RAN NF comprising the FM MS and the PM MS.

16. The non-transitory computer readable recording medium as claimed in claim 15, the method further comprising:
receiving, by the FCAPSR MS from another FM MS of a second RAN NF, third data comprising fault event data;
receiving, by the FCAPSR MS from another PM MS of a second RAN NF, fourth data comprising performance data; and
reporting, from the FCAPSR MS to the NBMS, at least one of the third data and the fourth data,
wherein the FCAPSR MS, the first RAN NF, and the second RAN NF are all located within the same host, and the FCAPSR MS is external and distinct from the first RAN NF comprising the FM MS and the PM MS and the second RAN NF comprising the other FM MS and the other PM MS.

17. The non-transitory computer readable recording medium as claimed in claim 15, wherein the fault event data comprises information on at least one fault or error event, and wherein the performance data comprises at least one performance statistic or counter.

18. The non-transitory computer readable recording medium as claimed in claim 15, wherein the first data is collected by the FM MS in the first RAN NF, and wherein the second data is collected by the PM MS in the first RAN NF.

19. The non-transitory computer readable recording medium as claimed in claim 18, wherein the first data is processed and/or encoded by the FM MS after being collected, and wherein the second data is processed and/or encoded by the PM MS after being collected.

20. The non-transitory computer readable recording medium as claimed in claim 15, further comprising:
 storing, by the FCAPSR MS, at least one of the first data and the second data in a persistent storage for at least one of resiliency of FCAPSR MS and restart handling of FCAPSR MS.

* * * * *